(12) United States Patent
Choi et al.

(10) Patent No.: US 11,985,754 B2
(45) Date of Patent: May 14, 2024

(54) NITROGEN OXIDE REDUCTION APPARATUS AND GAS TREATING APPARATUS

(71) Applicant: Edwards Korea Ltd., Chungcheong-nam-do (KR)

(72) Inventors: Yun Soo Choi, Chungcheong-nam-do (KR); Chan Kyoo Ko, Chungcheong-nam-do (KR); Simone Magni, Chungcheong-nam-do (KR)

(73) Assignee: Edwards Korea Ltd., Chungcheong-Nam-Do (KR)

( * ) Notice: Subject to any disclaimer, the term of this patent is extended or adjusted under 35 U.S.C. 154(b) by 724 days.

(21) Appl. No.: 16/479,884

(22) PCT Filed: Dec. 28, 2017

(86) PCT No.: PCT/KR2017/015694
§ 371 (c)(1),
(2) Date: Jul. 22, 2019

(87) PCT Pub. No.: WO2018/135772
PCT Pub. Date: Jul. 26, 2018

(65) Prior Publication Data
US 2021/0410264 A1    Dec. 30, 2021

(30) Foreign Application Priority Data
Jan. 23, 2017 (KR) .................. 10-2017-0010394

(51) Int. Cl.
*H05H 1/28*    (2006.01)
*H05H 1/34*    (2006.01)
*H05H 1/40*    (2006.01)

(52) U.S. Cl.
CPC ............ *H05H 1/28* (2013.01); *H05H 1/3468* (2021.05); *H05H 1/40* (2013.01)

(58) Field of Classification Search
CPC .. H05H 1/28; H05H 1/20; H05H 1/30; H05H 1/32; H05H 1/3468; H05H 1/36;
(Continued)

(56) References Cited

U.S. PATENT DOCUMENTS 3,663,792 A    5/1972  Fey
4,144,444 A    3/1979  Dementiev et al.
(Continued)

FOREIGN PATENT DOCUMENTS

CN    10224406 A    *  7/2008    ............. B01D 53/32
CN    101224406 A       7/2008
(Continued)

OTHER PUBLICATIONS

WO-03066197-A1, Aug. 2003, Kim (Year: 2003).*
(Continued)

*Primary Examiner* — Hung D Nguyen
(74) *Attorney, Agent, or Firm* — Shumaker & Sieffert, P.A.

(57) ABSTRACT

A gas treating apparatus may include a reaction chamber configured to process a gas supplied from an outside by a plasma, the processed gas containing a nitrogen oxide, and a nitrogen oxide reduction apparatus connected to the reaction chamber. The nitrogen oxide reduction apparatus includes a cooling unit configured to cool the processed gas to a temperature lower than a nitrogen oxide generation temperature.

4 Claims, 10 Drawing Sheets

(58) Field of Classification Search
CPC .. H05H 1/40; H05H 1/42; H05H 1/44; H05H 2245/15; H05H 2245/17; B01D 47/027; B01D 47/06; B01D 47/14; B01D 53/1456; B01D 53/32; B01D 53/323; B01D 53/68; B01D 53/70; B01D 53/75; B01D 53/76; B01D 2252/103; B01D 2257/204; B01D 2257/404; B01D 2257/553; B01D 2258/0216; B01D 2259/818

See application file for complete search history.

(56) References Cited

U.S. PATENT DOCUMENTS

| | | |
|---|---|---|
| 4,174,256 A | 11/1979 | Kistemaker |
| 4,455,470 A | 6/1984 | Klein et al. |
| 4,661,682 A * | 4/1987 | Gruner ............ H05H 1/42 219/121.52 |
| 4,818,837 A * | 4/1989 | Pfender ............ H05H 1/36 219/121.36 |
| 4,847,466 A | 7/1989 | Pasquini et al. |
| 4,882,465 A | 11/1989 | Smith et al. |
| 4,896,017 A | 1/1990 | Koppel et al. |
| 4,970,364 A | 11/1990 | Muller |
| 5,026,464 A | 6/1991 | Mizuno et al. |
| 5,041,713 A | 8/1991 | Weidman |
| 5,090,340 A * | 2/1992 | Burgess ............ F23G 5/085 219/121.48 |
| 5,281,790 A | 1/1994 | Nguyen et al. |
| 5,296,672 A | 3/1994 | Ramakrishnan et al. |
| 6,045,618 A | 4/2000 | Raoux et al. |
| 6,187,072 B1 | 2/2001 | Cheung et al. |
| 6,193,802 B1 | 2/2001 | Pang et al. |
| 7,589,473 B2 | 9/2009 | Suslov |
| 7,928,338 B2 | 4/2011 | Suslov |
| 8,109,928 B2 | 2/2012 | Suslov |
| 8,536,481 B2 | 9/2013 | Kong et al. |
| 8,802,567 B2 | 8/2014 | Okumura et al. |
| 9,150,949 B2 | 10/2015 | Belashchenko |
| 9,376,740 B2 | 6/2016 | Belashchenko |
| 9,420,680 B2 | 8/2016 | Kusano |
| 9,511,240 B2 | 12/2016 | Dobrynin et al. |
| 9,653,265 B2 | 5/2017 | Vandermeulen |
| 9,822,974 B2 | 11/2017 | Kawamura et al. |
| 9,926,624 B2 | 3/2018 | Yamada et al. |
| 9,997,322 B2 | 6/2018 | Kong et al. |
| 2005/0211018 A1 | 9/2005 | Jurewicz et al. |
| 2005/0227020 A1 | 10/2005 | Sharafutdinov et al. |
| 2009/0113912 A1* | 5/2009 | Kishimoto ............ F25B 9/002 62/259.1 |
| 2009/0188898 A1* | 7/2009 | Kong ............ H01J 1/02 219/121.52 |
| 2010/0078309 A1 | 4/2010 | Ueda et al. |
| 2010/0252411 A1 | 10/2010 | Awaji et al. |
| 2010/0276283 A1 | 11/2010 | Muenz et al. |
| 2011/0162523 A1 | 7/2011 | Fabbri et al. |
| 2011/0174031 A1 | 7/2011 | Bargiacchi et al. |
| 2011/0180403 A1 | 7/2011 | Shiina |
| 2012/0097870 A1 | 4/2012 | Leray et al. |
| 2012/0277515 A1 | 11/2012 | Lemont et al. |
| 2013/0161298 A1 | 6/2013 | Yan et al. |
| 2013/0236652 A1 | 9/2013 | Belashchenko |
| 2014/0094040 A1 | 4/2014 | Okumura et al. |
| 2014/0183033 A1 | 7/2014 | Spitzl et al. |
| 2014/0184073 A1 | 7/2014 | Crowley et al. |
| 2014/0295362 A1 | 10/2014 | Kawamura et al. |
| 2015/0021473 A1 | 1/2015 | Vandermeulen |
| 2016/0024635 A1 | 1/2016 | Belashchenko |
| 2016/0024849 A1 | 1/2016 | Kocis et al. |
| 2016/0086774 A1 | 3/2016 | Okumura et al. |
| 2016/0120014 A1 | 4/2016 | Laurisch et al. |
| 2017/0086284 A1 | 3/2017 | Carabin et al. |
| 2018/0228014 A1 | 8/2018 | Magni et al. |
| 2018/0243687 A1 | 8/2018 | Magni et al. |
| 2020/0109473 A1 | 4/2020 | Guo |

FOREIGN PATENT DOCUMENTS

| | | | | |
|---|---|---|---|---|
| CN | 101282782 A | 10/2008 | | |
| CN | 101394704 A | 3/2009 | | |
| CN | 102137705 A | 7/2011 | | |
| CN | 102387653 A | 3/2012 | | |
| CN | 203582762 U | 5/2014 | | |
| CN | 106508113 B | 7/2014 | | |
| CN | 204362408 U | 5/2015 | | |
| CN | 104707987 A | 6/2015 | | |
| CN | 105448636 A | 3/2016 | | |
| DE | 2512719 A1 | 10/1976 | | |
| EP | 0072408 A2 | 2/1983 | | |
| GB | 2484209 A | 4/2012 | | |
| JP | 51117977 A | 10/1976 | | |
| JP | 85836671 A | 3/1983 | | |
| JP | 6340299 A | 2/1988 | | |
| JP | S63250097 A | 10/1988 | | |
| JP | S63252398 A | 10/1988 | | |
| JP | 389920 A | 4/1991 | | |
| JP | H05144593 A | 6/1993 | | |
| JP | H08199372 A | 8/1996 | | |
| JP | H08318129 A | 12/1996 | | |
| JP | 2000096247 A | 4/2000 | | |
| JP | 2000288510 A | 10/2000 | | |
| JP | 2003251146 A | 9/2003 | | |
| JP | 2004307990 A | 11/2004 | | |
| JP | 2008194637 A | 8/2008 | | |
| JP | 2008194674 A | 8/2008 | | |
| JP | 2009240983 A | 10/2009 | | |
| JP | 2013512406 A | 4/2013 | | |
| JP | 2016530098 A | 9/2016 | | |
| KR | 20030067241 A | 8/2003 | | |
| KR | 100656093 | * | 8/2006 | ............ F23G 5/36 |
| KR | 100656093 B1 | * | 12/2006 | ............ F23G 5/36 |
| KR | 20080067268 A | 7/2008 | | |
| KR | 20090030588 A | 3/2009 | | |
| KR | 20090076084 A | 7/2009 | | |
| KR | 20090123479 A | 12/2009 | | |
| KR | 20100124967 A | 11/2010 | | |
| KR | 20110105674 A | 9/2011 | | |
| KR | 1020120131959 | 12/2012 | | |
| KR | 20140118898 A | 10/2014 | | |
| TW | 200829325 A | 7/2008 | | |
| WO | WO-03066197 A1 | * | 8/2003 | ............ A62D 3/19 |
| WO | 2006031075 A1 | 3/2006 | | |
| WO | 2007043783 A1 | 4/2007 | | |
| WO | 2010110694 A1 | 9/2010 | | |
| WO | 2015172237 A1 | 11/2015 | | |
| WO | 2018135771 A1 | 7/2018 | | |

OTHER PUBLICATIONS

KR100656093,Aug. 2006, Jeong (Year: 2006).*
Office Action from U.S. Appl. No. 16/479,890, dated Sep. 22, 2021, 11 pp.
Office Action dated Jun. 7, 2021 for corresponding CN Application No. 201780088862.6, 17 pgs.
Search Report dated May 31, 2021 for corresponding CN Application No. 201780088862.6, 3 pgs.
Office Action dated Jul. 19, 2021 for corresponding JP Application No. 2019-560612, 14 pgs.
International Search Report dated Apr. 24, 2018 received in counterpart International Application No. PCT/KR2017/015694, 3 pp.
Written Opinion of the International Search Authority dated Apr. 24, 2018, received in counterpart International Application No. PCT/KR2017/015694, 7 pp.
Response to Office Action dated Sep. 22, 2021, from U.S. Appl. No. 16/479,890, filed Mar. 15, 2022, 7 pp.
Decision for Final Rejection, and translation thereof, from counterpart Japanese Application No. 2019-560612 dated Apr. 15, 2022, 4 pp.
Notice of Allowance from U.S. Appl. No. 16/479,890, dated Mar. 31, 2022, 9 pp.
Notice of Allowance from U.S. Appl. No. 16/479,890 dated Jul. 13, 2022, 13 pp.

(56) References Cited

OTHER PUBLICATIONS

Decision of Rejection, and translation thereof, from counterpart Korean Application No. 10-2017-0010393 dated Oct. 23, 2023, 19 pp.

* cited by examiner

[Fig. 1]
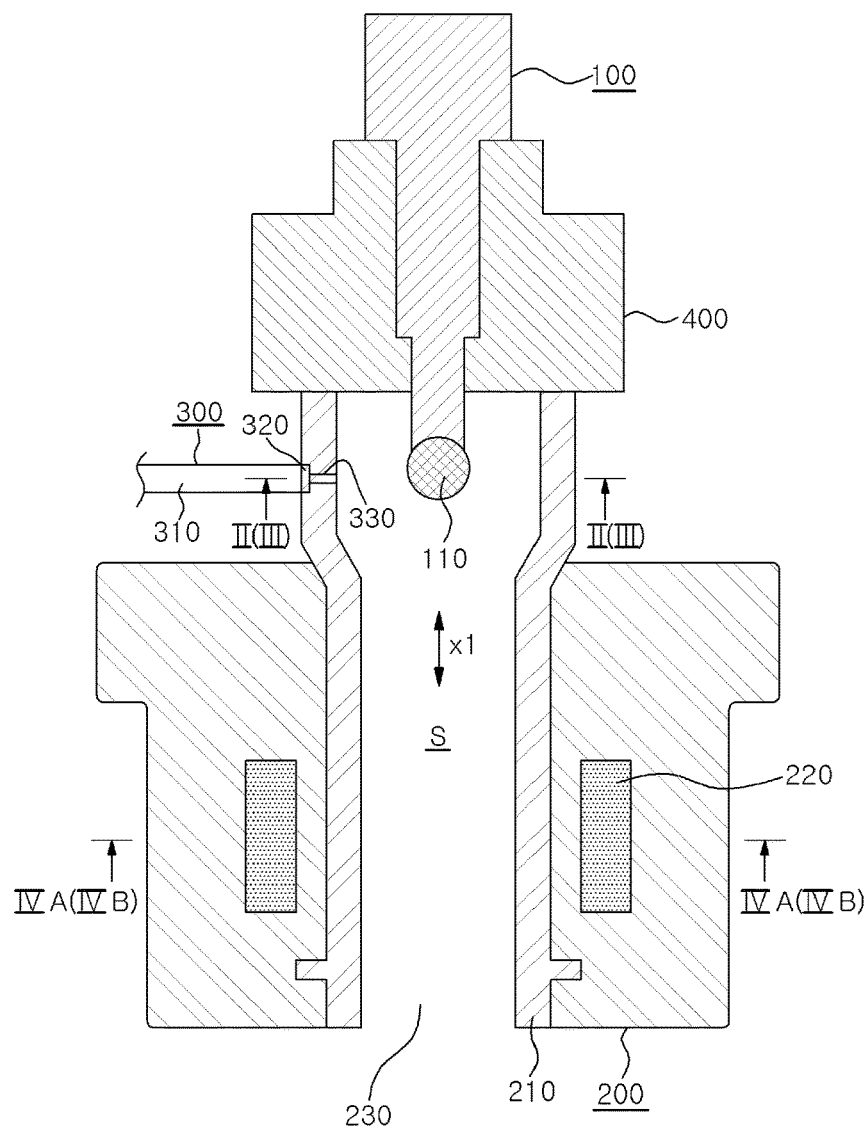
[Fig. 2]
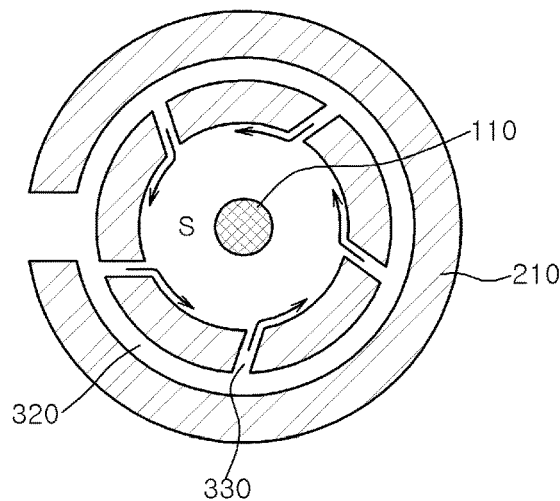

[Fig. 3]
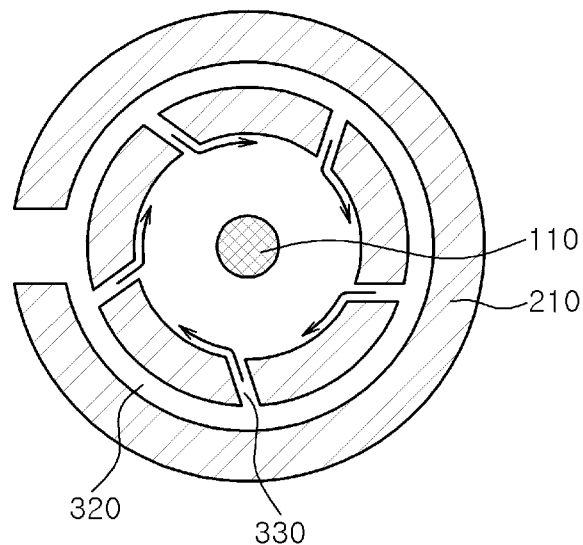
[Fig. 4a]
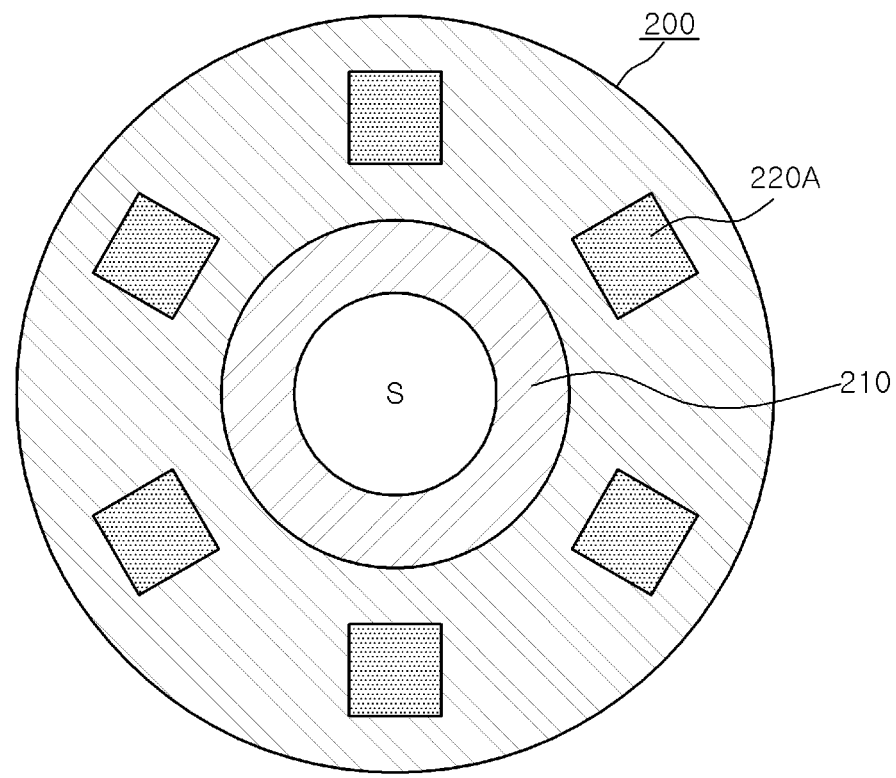

[Fig. 4b]
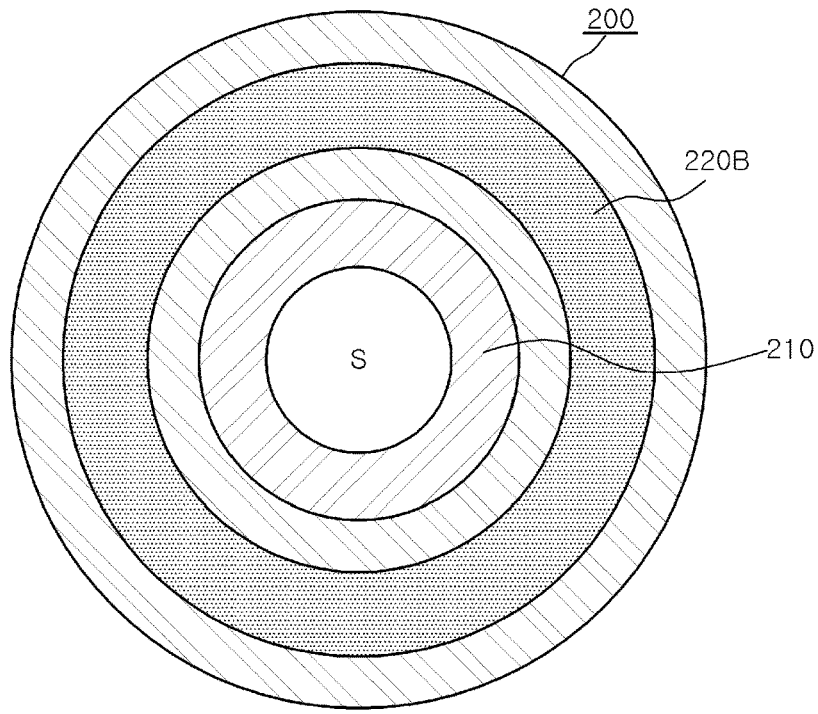
[Fig. 5]
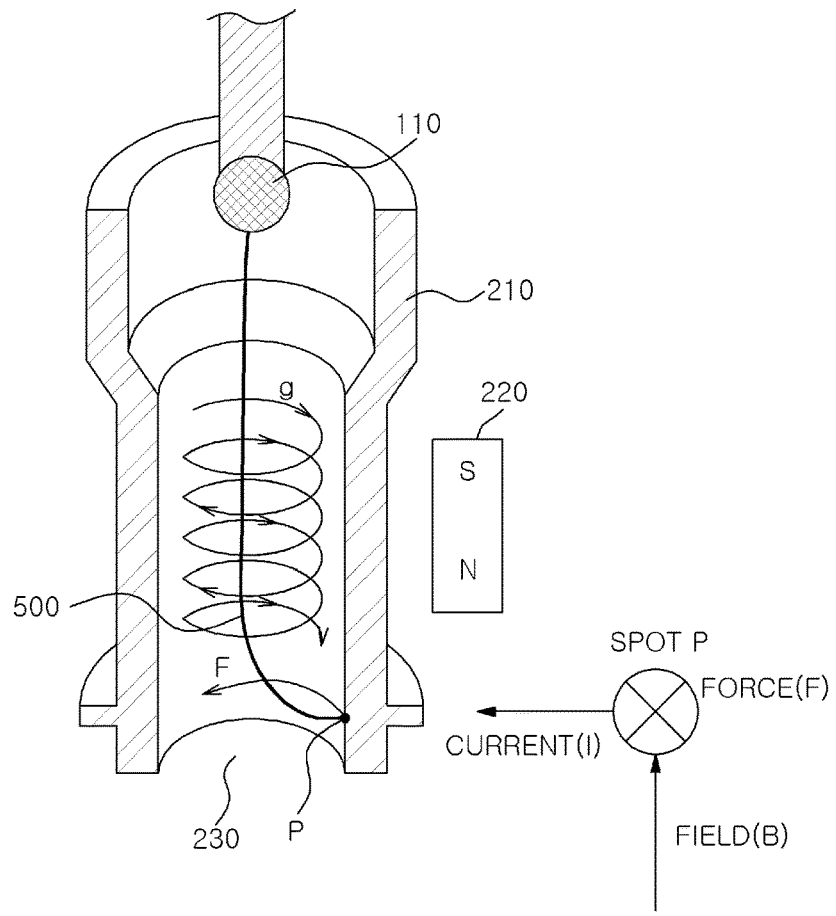

[Fig. 6]
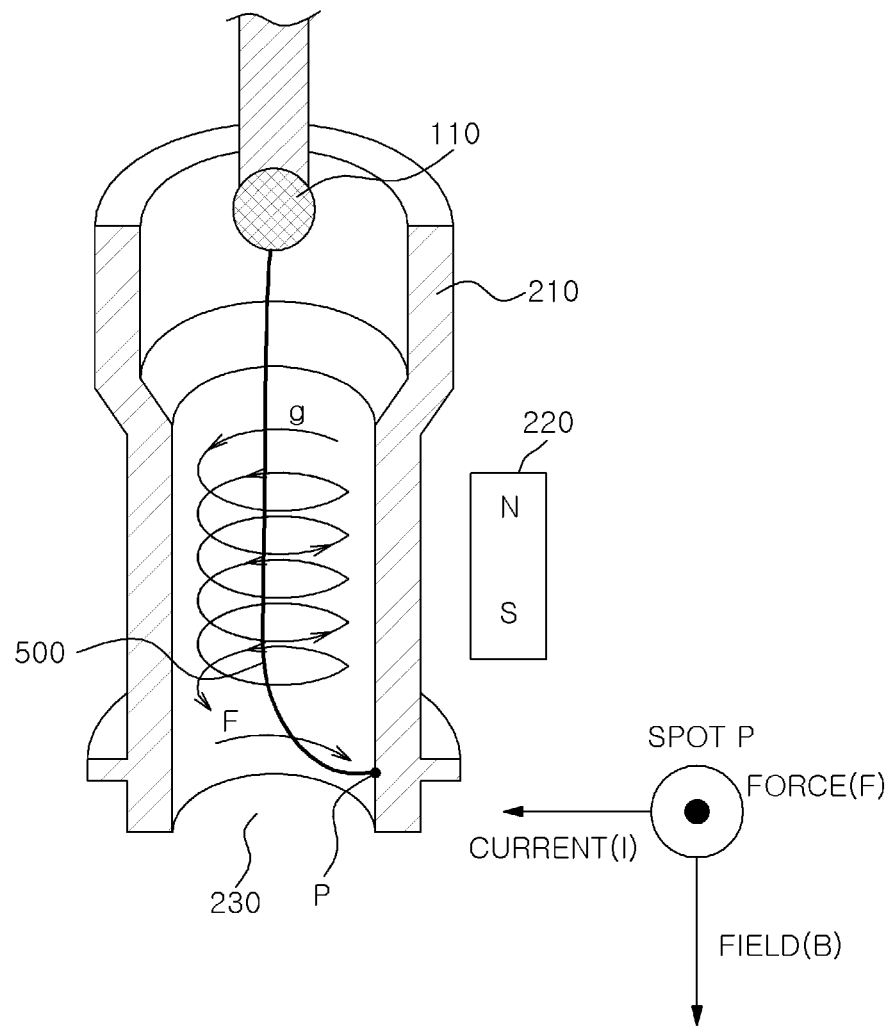

[Fig. 7]
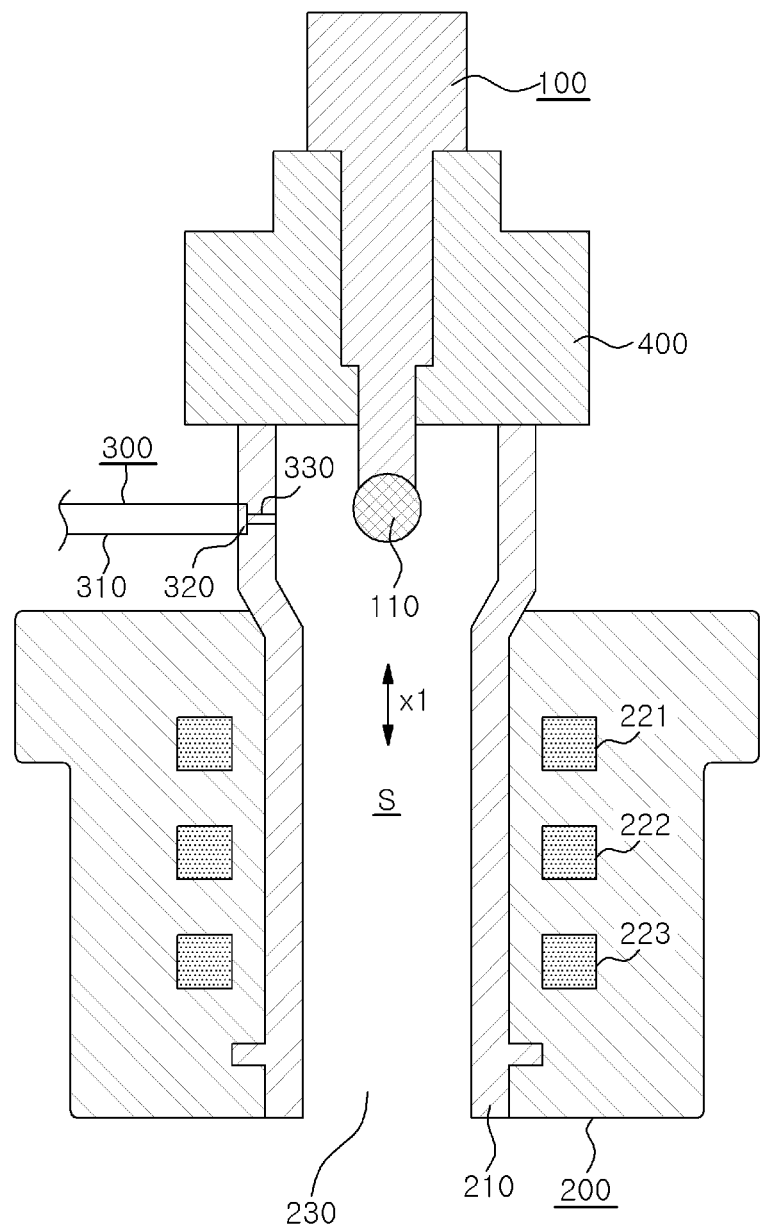

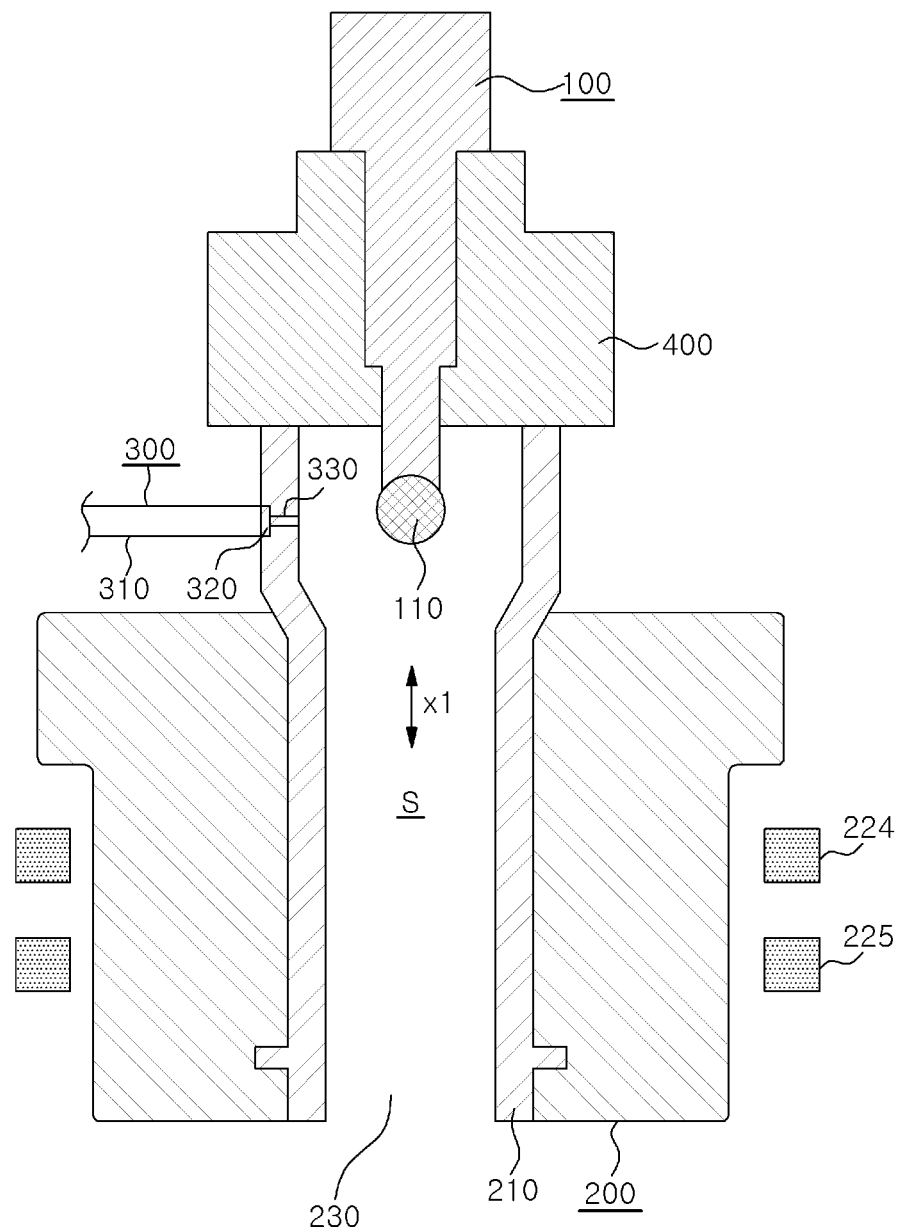
[Fig. 8]

[Fig. 9]
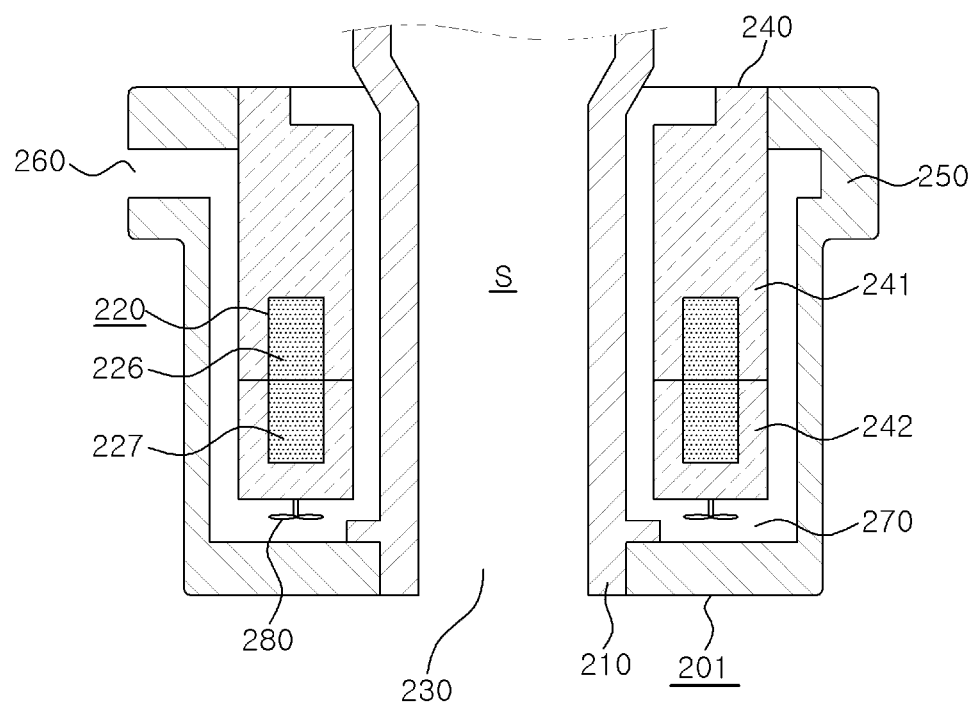

[Fig. 10]
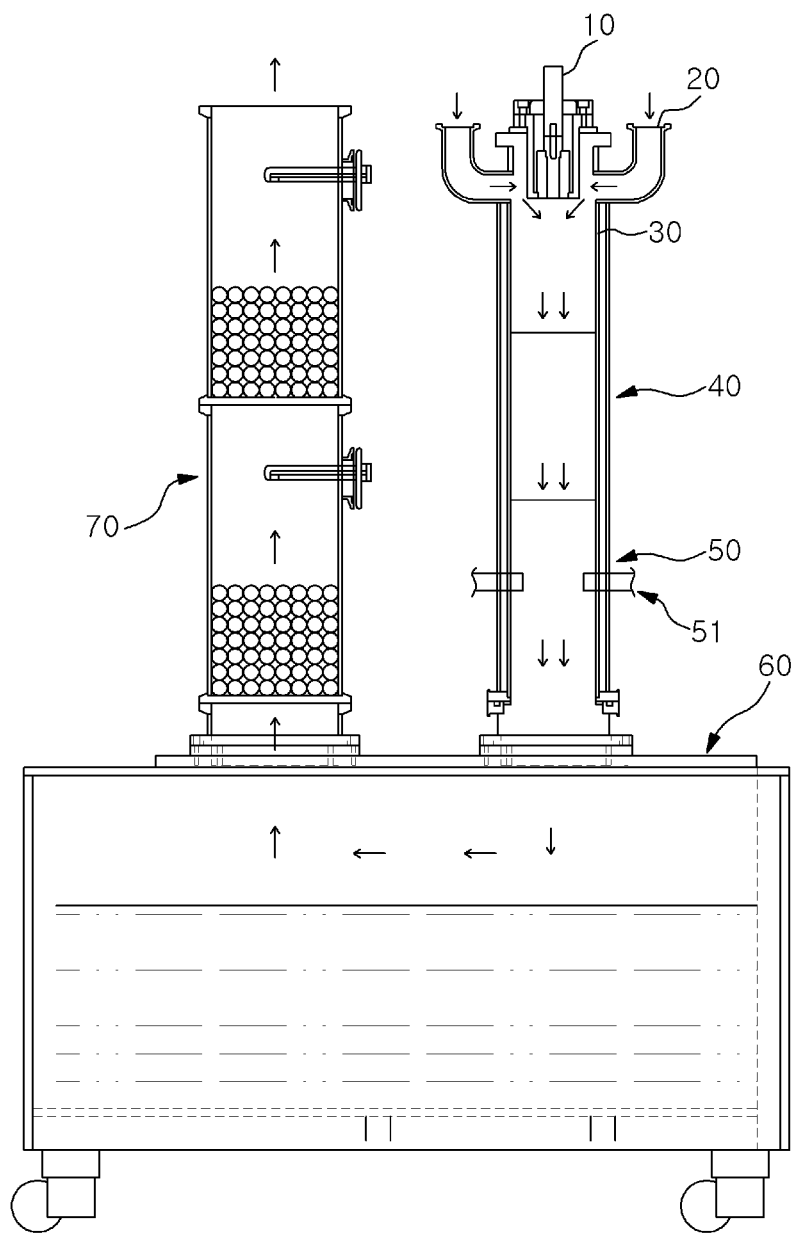

FIG.11
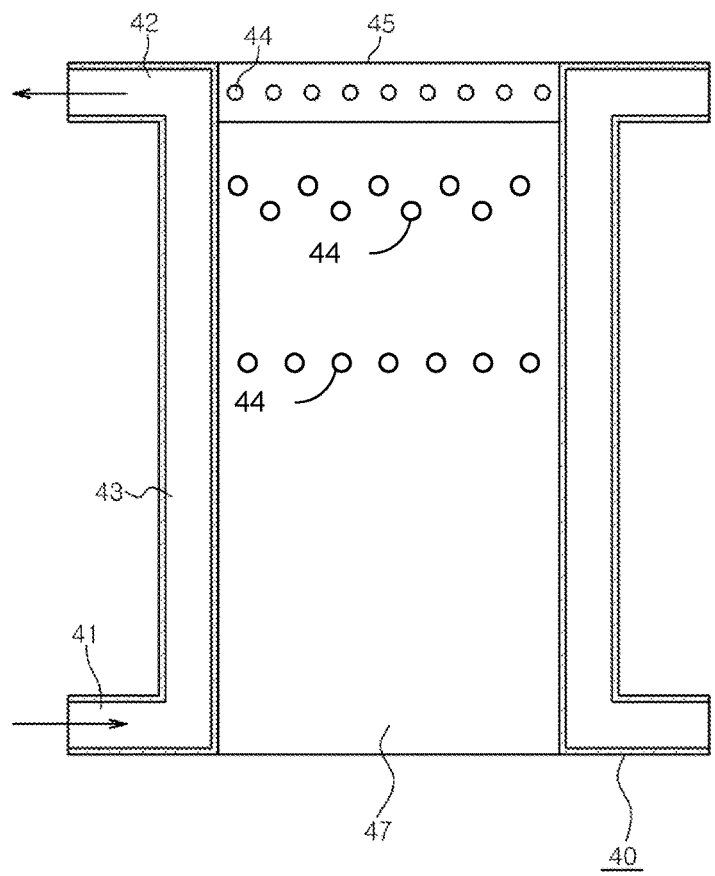
[Fig. 12]
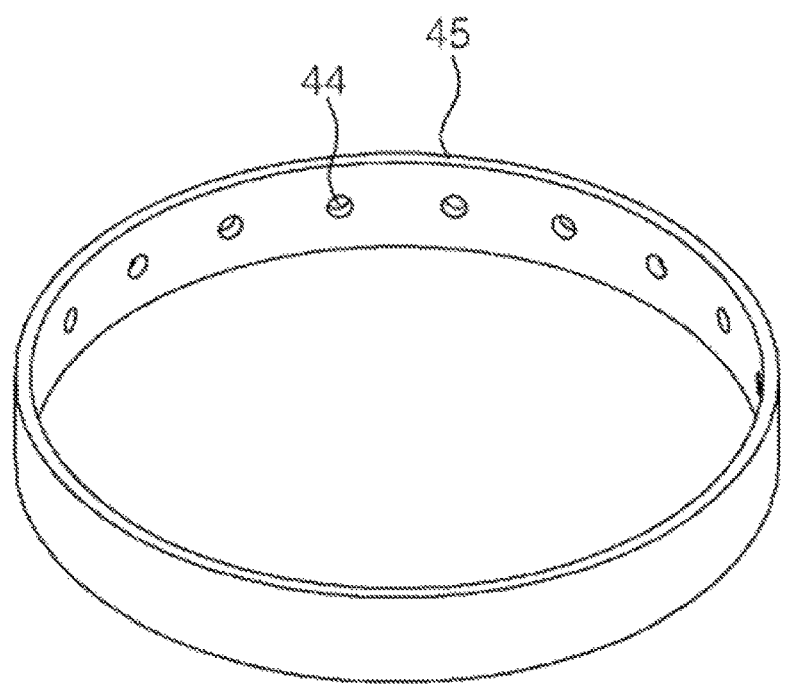

[Fig. 13]
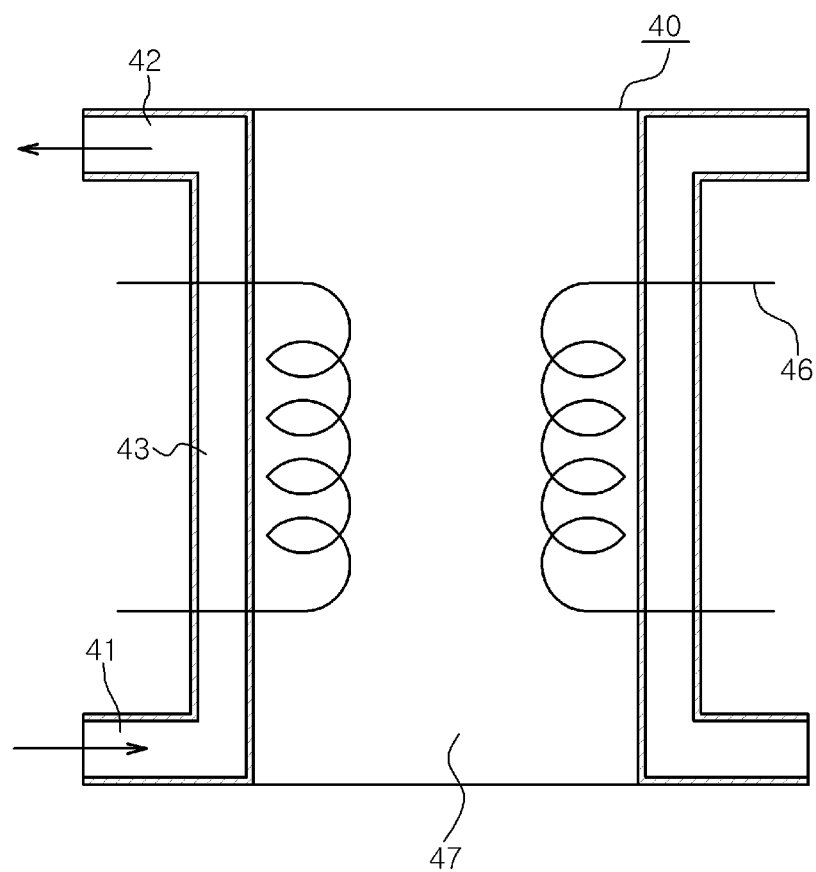

NITROGEN OXIDE REDUCTION APPARATUS AND GAS TREATING APPARATUS

This application is a national stage entry under 35 U.S.C. § 371 of International Application No. PCT/KR2017/015694, filed Dec. 28, 2017, which claims the benefit of KR Application 10-2017-0010394, filed Jan. 23, 2017. The entire contents of International Application No. PCT/KR2017/015694 and KR Application 10-2017-0010394 are incorporated herein by reference.

TECHNICAL FIELD

The present disclosure relates to a nitrogen oxide reduction apparatus and a gas treating apparatus including the nitrogen oxide reduction apparatus.

BACKGROUND

In the case of decomposing a harmful gas by using a plasma generating apparatus, the harmful gas is processed at a high temperature and this may generate nitrogen oxide. Particularly, at a high temperature of about 800° C. or above, the amount of thermal NOx (Nitrogen Oxide) produced by a reaction with a reactant gas containing oxygen is increased. The nitrogen oxide causes acid rain and photochemical smog and is considered as one of the main air pollutants. Therefore, a technique capable of reducing nitrogen oxide is required.

Conventionally, a catalytic device or a dilution device was used for processing nitrogen oxide. However, those devices are not cost-effective. As another solution, the use of an oxygen-containing material has been avoided to prevent the generation of nitrogen oxide. However, in the case of decomposing the harmful gas by using a material that does not contain oxygen, another toxic substance or other by-product is generated and deposited on the inner surface of the apparatus. Also, the harmful gas processing efficiency is decreased.

(Patent Document 1) Korean Patent Application Publication No. 10-2008-0105377 (published on Dec. 4, 2008.)

SUMMARY

In view of the above, it is an object of the present disclosure to provide a gas treating apparatus and a nitrogen oxide reduction apparatus capable of reducing nitrogen oxide.

It is a further object of the present disclosure to provide a technique for improving the stability and durability of a plasma generating apparatus included in the gas treating apparatus.

In one embodiment of the present disclosure, a gas treating apparatus comprises a reaction chamber configured to process a gas supplied from an outside by a plasma, the processed gas containing a nitrogen oxide, and a nitrogen oxide reduction apparatus connected to the reaction chamber. The nitrogen oxide reduction apparatus includes a cooling unit configured to cool the processed gas to a temperature lower than a nitrogen oxide generation temperature.

The nitrogen reduction apparatus and the gas treating apparatus according to the embodiments of the present disclosure provides the advantage of effectively reducing nitrogen oxide without decreasing the harmful gas processing efficiency by rapidly cooling the plasma-processed gas to a temperature lower than a nitrogen oxide generation temperature by using the cooling unit.

The plasma generating apparatus included in the gas treating apparatus according to the embodiments of the present disclosure provides the advantage of being able to stably generate a plasma and increase the lifespan of the electrode by arranging the magnetic force generators to produce a force opposite the rotational direction of the vortex of the plasma generating gas that is generated in the plasma generation space.

BRIEF DESCRIPTION OF THE DRAWINGS

FIG. 1 schematically shows a plasma generating apparatus according to one embodiment of the present disclosure.

FIG. 2 is a cross sectional view of the plasma generating apparatus, taken along line "II-II" of FIG. 1.

FIG. 3 is another cross sectional view of the plasma generating apparatus, taken along line "III-III" of FIG. 1.

FIG. 4A is a cross sectional view of the plasma generating apparatus, taken along line "IVA-IVA" of FIG. 1.

FIG. 4B is another cross sectional view of the plasma generating apparatus, taken along line "IVB-IVB" of FIG. 1.

FIG. 5 shows a direction of a force applied to an anode arc spot of the plasma generating apparatus according to an embodiment of the present disclosure.

FIG. 6 shows a direction of a force applied to the anode arc spot of the plasma generating apparatus according to an embodiment of the present disclosure.

FIG. 7 schematically shows a plasma generating apparatus according to another embodiment of the present disclosure.

FIG. 8 schematically shows a plasma generating apparatus according to still another embodiment of the present disclosure.

FIG. 9 shows a configuration of an anode assembly according to an embodiment of the present disclosure.

FIG. 10 schematically shows a gas treating apparatus according to an embodiment of the present disclosure.

FIG. 11 shows a nitrogen oxide reduction apparatus according to an embodiment of the present disclosure.

FIG. 12 shows a gas supply ring according to an embodiment of the present disclosure.

FIG. 13 shows a nitrogen oxide reduction apparatus according to another embodiment of the present disclosure.

DETAILED DESCRIPTION

The advantages and features of the present disclosure and the methods of accomplishing such will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that the detailed description of related known components or functions unnecessarily obscures the gist of the present disclosure, the detailed description thereof will be omitted. Further, the terminologies to be described below are defined in consideration of the functions of the embodiments of the present disclosure and may vary depending on a user's or an operator's intention or practice.

Accordingly, the definition thereof may be made on a basis of the content throughout the specification.

FIG. 1 schematically shows a plasma generating apparatus according to an embodiment of the present disclosure. The plasma generating apparatus may be a plasma torch.

The plasma generating apparatus includes: a cathode assembly 100 for generating an arc discharge by a high voltage applied thereto; an anode assembly 200 for generating a plasma having a temperature of 1000° C. or above in a plasma generation space S formed by the arc discharge between the anode assembly 200 and the cathode assembly 100; a gas introduction line (plasma generating gas introduction line) 300 for supplying a plasma generating gas to the plasma generation space S; and a magnetic force generator 220 for generating a magnetic force in the plasma generation space S.

The cathode assembly 100 will be described in detail hereinafter.

The cathode assembly 100 has a cathode 110 that a high voltage is applied to at a lower portion thereof. Further, the cathode assembly 100 may have therein a path through which cooling water flows. A cooling water path extends to the cathode 110 and allows the high-temperature cathode 110 to be cooled effectively during the operation of the cathode assembly 100. Accordingly, the abrasion of the cathode 110 can be prevented.

Preferably, the cathode 110 is made of hafnium or tungsten added with thorium or yttrium. However, the cathode 110 may contain another metal.

As shown in FIG. 1, one end portion of the cathode assembly 100 is positioned outside the anode assembly 200, and the other end portion of the cathode assembly 100 (i.e., the side where the cathode 110 is provided) is coupled with the anode assembly 200 to be located in the plasma generation space S of the anode assembly 200.

An insulator 400 is interposed between the cathode assembly 100 and the anode assembly 200. Accordingly, the cathode assembly 100 and the anode assembly 200 are insulated from each other.

Next, the anode assembly 200 will be described in detail hereinafter.

The anode assembly 200 is formed in a cylindrical shape so that the plasma generation space S can be formed therein while surrounding the cathode 110 of the cathode assembly 100. The anode assembly 200 includes an anode 210 for generating a plasma between the anode 210 and the cathode 110 by applying a high voltage to the cathode 110.

In other words, the anode assembly 200 has therein the plasma generation space S where a plasma is generated by DC arc discharge between the anode assembly 200 and the cathode assembly 100. The cathode 110 of the cathode assembly 100 is positioned at an upper portion of the plasma generation space S. The DC arc discharge occurs between the cathode 110 and the anode 210 by the high voltage applied to the cathode assembly 100.

At this time, an axis X1 of the anode assembly 200 may coincide with an axis of the cathode assembly 110.

A plasma generating gas introduction line 300 extending from an external plasma generating gas supply unit (not shown) to the plasma generation space S is provided at one end portion (i.e., upstream end portion) of the anode assembly 200. An opening 230 is provided at the other end portion (i.e., downstream end portion) of the anode assembly 200. The opening 230 may be referred to as a "torch outlet". The plasma flame is discharged through the opening 230.

A plasma generating gas introduction line 300 is configured to communicate with the plasma generation space S.

The plasma generating gas, e.g., one selected from a group consisting of argon, nitrogen, helium, hydrogen, oxygen, vapor, ammonia and a mixture of some of these gases, is introduced into the plasma generation space S through the plasma generating gas introduction line 300. Then, the plasma generating gas is ionized by the arc discharge occurring in the plasma generation space S, thereby generating the plasma.

The plasma generating gas introduction line 300 includes an inlet path 310, a distribution space 320 and a plurality of gas supply paths 330. The plasma generating gas introduced into the distribution space 320 through the inlet path 310 can be distributed in the distribution space 320 formed along a circumferential direction of the anode 210 and then supplied to the plasma generation space S through the gas supply paths 330.

At this time, the gas supply paths 330 are formed in parallel with or inclined with respect to a radial direction of the axis X1 of the anode assembly 200. FIGS. 2 and 3 show that the gas supply paths 330 are inclined at a predetermined angle, e.g., an acute angle (an angle less than 90 degrees), with respect to the radial direction of the axis X1 of the anode assembly 200. With this arrangement, the plasma generating gas can be uniformly introduced into the plasma generation space S while generating a vortex or a spiral flow.

FIGS. 2 and 3 are cross sectional views taken along line "II (III)-II (III)" of FIG. 1 when viewed from the opening 230 of the anode assembly 200 toward the plasma generating gas introduction line 300 (i.e., when viewed from the bottom of the anode assembly 200).

In FIG. 2, the plasma generating gas is introduced into the plasma generation space S while rotating in a counterclockwise direction by the inclined gas supply paths 330. In FIG. 3, the plasma generating gas is introduced into the plasma generation space S while rotating in a clockwise direction by the gas supply paths 330 inclined at a different angle from that shown in FIG. 2.

Further, the gas supply paths 330 may be inclined with respect to the direction of the axis X1 of the anode assembly 200. In other words, the gas supply paths 330 may be inclined horizontally at a predetermined angle as illustrated in FIGS. 2 and 3, or may be inclined vertically at a predetermined angle, or may be inclined horizontally and vertically at predetermined angles.

When the outlets of the gas supply paths 330 are formed at positions facing the cathode assembly 100, specifically the cathode 110, the plasma generating gas is introduced to rotate around the cathode assembly 100. Accordingly, the plasma can be uniformly generated in the plasma generation space S.

The anode assembly 200 may have a plasma holding part (not shown) extending from the lower end portion of the anode assembly 200. The plasma holding part maintains a plasma generated between the cathode 110 and the anode 210 in a stable state. When the anode assembly 200 has the plasma holding part, the plasma generation space S is extended to an inner space of the plasma holding part. By allowing the arc to occur at the inner space of the plasma holding part, the plasma may have an increased length in an axial direction and an increased diameter in a horizontal direction. The inner space of the plasma holding part may have, e.g., a shape in which an inner diameter is gradually increased with stepped portions toward a lower portion of the plasma holding part or a shape in which an inner diameter of the plasma generation space S becomes continuously greater toward a lower portion of the plasma holding part, as long as the generated plasma can be maintained in a stable state and guided downward.

Next, the magnetic force generator 220 will be described in detail hereinafter.

The magnetic force generator 220 is provided either inside or outside the anode assembly 200. The magnetic force generator 220 generating a magnetic force may be a permanent magnet or an electromagnet.

Further, the magnetic force generator 220 may include a plurality of permanent magnets or electromagnets arranged radially with respect to the axis X1 of the anode assembly 200 or may include a single ring-shaped permanent magnet or electromagnet.

FIG. 4A is a cross sectional view of the plasma generating apparatus, taken along line "IVA-IVA" of FIG. 1, showing that the magnetic force generator 220 includes a plurality of permanent magnets 220A embedded in the anode assembly 200 and arranged radially with respect to the axis X1 of the anode assembly 200. In FIG. 4A, the magnetic force generator 220 includes six permanent magnets 220A. However, the number of the permanent magnets 220A is not limited to six and may be smaller than six or may be greater than six.

FIG. 4B is a cross sectional view of another plasma generating apparatus, taken along line "IVBB-IVB" of FIG. 1, showing that the magnetic force generator 220 includes a single ring-shaped permanent magnet 220B embedded in the anode assembly 200. An axis of the permanent magnet 220B may coincide with the axis X1 of the anode assembly 200.

FIG. 7 schematically shows a plasma generating apparatus according to another embodiment of the present disclosure, showing that a plurality of permanent magnets 221, 222 and 223 arranged radially with respect to the axis X1 of the anode assembly 200 is provided at multiple levels inside the anode assembly 200.

FIG. 8 schematically shows a plasma generating apparatus according to still another embodiment of the present disclosure, showing that a plurality of permanent magnets 224 and 225 arranged radially with respect to the axis X1 of the anode assembly 200 is provided at multiple levels outside the anode assembly 200. The magnetic force generator 220 provided outside the anode assembly 200 is movable in a direction parallel with the axis X1 of the anode assembly 200 and in a direction perpendicular to the axis X1 of the anode assembly 200.

The embodiments of present disclosure are intended to provide a plasma generating apparatus that can improve the stability and durability by applying a force to an anode arc spot of the arc generated in the plasma generation space S by controlling the arrangement of the magnetic force generator 220. This will be described in detail with reference to FIG. 5.

FIG. 5 shows partial configurations of the cathode assembly 100 and the anode assembly 200 according to an embodiment of the present disclosure. When a high voltage is applied to the cathode 110 of the cathode assembly 100, an arc 500 occurs between the cathode 110 and the anode 210 in the plasma generation space S, and an anode arc spot P, which is a part of the arc 500, is positioned on the anode 210.

At this time, when the plasma generating gas is introduced into the plasma generation space S through the plasma generating gas introduction line 300, the position of the anode arc spot P is changed by the flow of the plasma generating gas. For example, if the plasma generating gas is introduced in the counterclockwise direction (see FIG. 2) when viewed from the opening 230 of the anode assembly 200 toward the plasma generating gas introduction line 300 (i.e., when viewed from the bottom of the anode assembly 200), the anode arc spot P is rotated in the counterclockwise direction by the plasma generating gas. In FIG. 5, the direction of the vortex of the plasma generating gas is indicated by "g".

When the plasma generating apparatus operates at a high voltage, the anode arc spot P is positioned near the opening 230 of the anode assembly 200. Due to the vortex of the plasma generating gas, the anode arc spot P may be deviated from the end portion of the anode assembly 200. In that case, the plasma becomes drastically unstable. In order to maintain the plasma in a stable state, it is required to increase the current or operate the plasma generating apparatus at a low voltage. However, according to an embodiment of the present disclosure, it is intended to prevent the anode arc spot P from deviating from the end portion of the anode assembly 200 without increasing the current or operating the plasma generating apparatus at a low voltage. To do so, the magnetic force generator 220 needs to be arranged such that a force is applied to the anode arc spot P in a direction opposite the rotational direction g of the plasma generating gas.

In FIG. 5, the magnetic force generator 220 is arranged such that the polarities of the magnetic force generator 220 become opposite to each other in the direction of the axis X1 of the anode assembly 200. In FIG. 5, the plasma generating gas is introduced in the counterclockwise direction as described above. At this time, the N pole of the magnetic force generator 220 is directed toward the opening 230 of the anode assembly 200 (i.e., toward the lower portion of the anode assembly 200) and the S pole of the magnetic force generator 220 is directed toward the cathode 110 (i.e., toward the upper portion of the anode assembly 200).

With this arrangement of the magnetic force generator 220, a magnetic field B, directed from the bottom to the top of the anode assembly 200, is induced in the plasma generation space S. The current flows from the anode 210 toward the cathode 110, and near the position of the anode arc spot P, the current I flows from the inner wall of the anode 210 toward the axis X1 of the anode assembly 200. In that case, according to Fleming's left hand rule, the force F is generated in a direction toward the ground at the position of the anode arc spot P. In other words, when the rotational direction g of the plasma generating gas is in the counterclockwise direction, the N pole of the magnetic force generator 220 is directed toward the opening 230 of the anode assembly 200 in order to apply the force F in the clockwise direction to the anode arc spot P. At this time, the force F in the clockwise direction may include a component directed from the bottom to the top of the anode assembly 200.

Accordingly, even when the plasma generating apparatus operates at a high voltage, the anode arc spot P does not deviated from the end portion of the anode assembly 200 and, further, the plasma can be stably generated in the plasma generation space S. In addition, it is possible to avoid abrasion and loss of the anode assembly 200, which are caused when the arc is concentrated at a specific portion of the anode assembly 200 by moving the anode arc spot P by the force generated by the magnetic field B induced by the magnetic force generator 220. As a result, the lifespan of the anode assembly 200 can be extended.

FIG. 6 shows the partial configurations of the cathode assembly 100 and the anode assembly 200 according to an embodiment of the present disclosure, showing that the rotational direction g of the plasma generating gas is different from that shown in FIG. 5. For example, if the plasma generating gas is introduced in the clockwise direction (see FIG. 3) when viewed from the opening 230 of the anode assembly 200 toward the plasma generating gas introduction line 300 (i.e., when viewed from the bottom to the top of the anode assembly 200), the anode arc spot P is rotated in the clockwise direction by the plasma generating gas.

At this time, the S pole of the magnetic force generator 220 is directed toward the opening 230 of the anode assembly 200 (i.e., toward the lower portion of the anode assembly 200) and the N pole of the magnetic force generator 220 is directed toward the cathode 110 (i.e., toward the upper portion of the anode assembly 200).

With this arrangement of the magnetic force generator 220, the magnetic field B directed from the top to the bottom of the anode assembly 200 is induced in the plasma generation space S. The current flows from the anode 210 toward the cathode 110, and near the position of the anode arc spot P, the current I flows from the inner wall of the anode 210 toward the axis X1 of the anode assembly 200. In that case, according to Fleming's left hand rule, the force F is generated in a direction upward from the ground at the position of the anode arc spot P. In other words, when the rotational direction g of the plasma generating gas is in the clockwise direction, the S pole of the magnetic force generator 220 may be directed toward the opening 230 of the anode assembly 200 in order to apply a force F in the counterclockwise direction to the anode arc spot P. At this time, the force F in the counterclockwise direction may include a component directed from the bottom to the top of the anode assembly 200.

Accordingly, even when the plasma generating apparatus operates at a high voltage, the plasma can be stably generated and the lifespan of the anode assembly 200 can be extended.

In FIGS. 5 and 6, the arrangements of the polarities of the single magnetic force generator are illustrated, for example. As in the cases shown in FIGS. 5 and 6, the polarities of the multiple permanent magnets 220A shown in FIG. 4A, the polarities of the multiple magnetic force generators 221 to 223 shown in FIG. 7 and the polarities of the multiple magnetic force generators 224 and 225 shown in FIG. 8 may also be arranged such that a force is generated in the direction opposite the rotational direction of the plasma generating gas. Similarly, the ring-shaped permanent magnet 220B shown in FIG. 4B may be magnetized such that the polarities become opposite to each other in the direction of the axis X1 of the anode assembly 200 to thereby generate a force in the direction opposite the rotational direction of the plasma generating gas.

In FIGS. 5 and 6, the magnetic force generator 220 is arranged such that the force is applied to the anode arc spot P in the direction opposite the rotational direction g of the plasma generating gas. However, the arrangement of the magnetic force generator 220 is not limited thereto. Depending on the purpose, the magnetic force generator 220 may be arranged such that the force is applied to the anode arc spot P in the same direction as the rotational direction g of the plasma generating gas. For example, when the plasma generating gas is introduced in the counterclockwise direction as shown in FIG. 5, the S pole of the magnetic force generator 220 may be directed toward the opening 230 of the anode assembly 200 and the N pole of the magnetic force generator 220 may be directed toward the cathode 110. In this case, the magnetic field directed from the top to the bottom of the anode assembly 200 is induced in the plasma generation space S and the force in the counterclockwise direction is applied to the anode arc spot P. When the plasma generating gas is introduced in the clockwise direction as shown in FIG. 6, the N pole of the magnetic force generator 220 may be directed toward the opening 230 of the anode assembly 200 and the S pole of the magnetic force generator 220 may be directed toward the cathode 110. In that case, the magnetic field directed from the bottom to the top of the anode assembly 200 is induced in the plasma generation space S and the force in the clockwise direction is applied to the anode arc spot P.

In order to increase the lifespan of the anode assembly 200, various materials may be used for a guide member included in the anode assembly 200. This will be described in detail with reference to FIG. 9.

FIG. 9 shows a configuration of an anode assembly 201 according to another embodiment of the present disclosure. The anode assembly 201 shown in FIG. 9 may be used in the plasma generating apparatus of FIG. 1, instead of the anode assembly 200. Redundant description of the same components in FIGS. 1 and 9 is omitted.

The anode assembly 201 includes an anode 210 for generating a plasma between the anode 210 and the cathode 110 by applying a high voltage to the cathode 110, a guide member 240 surrounding the anode 210, and a housing 250 surrounding the guide member 240. The anode 210, the guide member 240 and the housing may have a cylindrical shape. The magnetic force generator 220 may be provided inside the guide member 240.

The guide member 240 may be made of metal or plastic. Preferably, the guide member 240 is made of plastic. When the guide member 240 is made of plastic, the magnetic field induced by the magnetic force generator 220 can be unchanged and the generation of a parasitic current, which may interfere or affect the magnetic field, can be prevented. Further, when the guide member 240 is made of plastic, heat is not transferred to the magnetic force generator 220 and, thus, the magnetic properties of the magnetic force generator 220 are not affected.

The guide member 240 includes a first guide 241 provided at an upper portion (i.e., the plasma generating gas introduction line 300 side in FIG. 1) and a second guide 242 provided at a lower portion (i.e., the opening 230 side in FIG. 1). The second guide 242 is made of plastic having a heat resistance higher than that of the first guide 241. The first guide member 241 may be made of plastic having low heat resistance, e.g., at least one of PVC (Polyvinyl Chloride) and nylon. The second guide member may be made of plastic having high heat resistance, e.g., at least one of PTFE (polytetrafluoroethylene) and PEEK (polytetrafluoroethylene). The anode assembly 201 near the opening 230 (i.e., near the torch outlet) has a relatively high temperature than the other portion of the anode assembly 201. However, by using those materials for the guide member 240, it is possible to prevent deterioration or melting of the anode assembly 201 near the opening 230 without a high cost.

The magnetic force generator 220 may be provided inside the guide member 240. At this time, the magnetic force generator 220 may be divided into a first magnetic force generator 226 provided inside the first guide 241 and a second magnetic force generator 227 provided inside the second guide 242. The first guide 241 and the second guide 242 may be coupled by screws or an adhesive agent. On the other hand, the first guide 241 and the second guide 242 may be coupled by a magnetic force generated by the polarities of the first magnetic force generator 226 and the second magnetic force generator 227.

The housing 250 may be made of stainless steel. A coolant path 270 is formed between the housing 250 and the guide member 240 and between the guide member 240 and the anode 210. Coolant (e.g., cooling water) supplied from a coolant supplier 260 flows through the coolant path 270, thereby cooling the anode assembly 201.

More specifically, the coolant flows downward through the coolant path 270 formed between the housing 250 and the guide member 240, and then flows through the coolant path 270 formed below a bottom surface of the guide member 240, and then flows upward through the coolant path 270 formed between the guide member 240 and the anode 210.

At this time, a fin 280 may be provided at the coolant path 270 formed below the bottom surface of the guide member 240. The fin 280 circulates the coolant more efficiently. Accordingly, the temperature of the anode assembly 201 near the opening 230 (i.e., near the torch outlet), which is relatively higher, can be effectively decreased.

The above-described plasma generating apparatus may be an apparatus for processing a material selected from a group consisting of perfluoro compounds, chlorofluoro carbons, hydrofluorocarbons, hydrochlorofluoro carbons, dioxin, furan, volatile organic compounds, polychlorinated biphenyl, and a compound thereof.

The configuration of the plasma generating apparatus having improved stability and durability has been described.

In the case of decomposing a harmful gas by using a plasma generating apparatus, the harmful gas is processed at a high temperature and this may generate nitrogen oxide. Particularly, at a high temperature of about 800° C. or above, the amount of thermal NOx (Nitrogen Oxide) produced by a reaction with a reactant gas containing oxygen is increased. The nitrogen oxide causes acid rain and photochemical smog and is considered as one of the main air pollutants. Therefore, a technique capable of reducing nitrogen oxide is required.

Conventionally, a catalytic device or a dilution device was used for processing nitrogen oxide. However, those devices are not cost-effective. As another solution, the use of an oxygen-containing material has been avoided to prevent the generation of nitrogen oxide. However, in the case of decomposing the harmful gas by using a material that does not contain oxygen, another toxic substance or other by-product is generated and deposited on the inner surface of the apparatus. Also, the harmful gas processing efficiency is decreased.

In order to resolve the above drawbacks, one embodiment of the present disclosure is intended to provide a nitrogen oxide reduction apparatus capable of effectively reducing nitrogen oxide without decreasing the harmful gas processing efficiency, and a gas treating apparatus including the nitrogen oxide reduction apparatus.

Hereinafter, the gas treating apparatus including the nitrogen oxide reduction apparatus capable of reducing nitrogen oxide will be described in detail.

FIG. 10 schematically shows the gas treating apparatus according to an embodiment of the present disclosure. A plasma scrubber is illustrated as an example of the gas treating apparatus.

In a semiconductor manufacturing process, acid gases such as $BCl_3$, $Cl_2$, $F_2$, HBr, HCl, HF and the like and PFCs gases such as $CF_4$, $CHF_3$, $C_2F_6$, $C_3F_8$, $C_4F_6$, $C_4F_8$, $C_5F_8$, $SF_6$ and the like are used for etching a surface of a wafer. In a CVD (Chemical Vapor Deposition) process, gases such as $AsH_3$, $NH_3$, $PH_3$, $SiH_4$, $Si_2H_2Cl_2$ and the like are used in a deposition step of the surface of the wafer, and PFCs gases such as $NF_3$, $C_2F_6$, $C_3F_8$ and the like are used in a cleaning step. The plasma scrubber is used for processing these gases.

The plasma scrubber includes a reaction chamber 30 and a nitrogen oxide reduction apparatus (a nitrogen oxide reduction chamber) 40. The plasma scrubber may further include a plasma torch 10, a pipe 50, a water tank 60 and an after-treatment unit 70.

The plasma torch 10 is a plasma generating apparatus for generating a plasma flame for thermally decomposing a gas introduced after the etching and the CVD process at a high temperature. The plasma generating apparatus described with reference to FIGS. 1 to 9 may be used as the plasma torch 10.

The reaction chamber 30 is connected to the plasma torch 10 and provides a space where the gas supplied through the gas supply line 20 is thermally decomposed by a high-temperature plasma. When the temperature in the reaction chamber reaches about 800° C. or above, thermal NOx is drastically generated. In order to suppress the generation of thermal NOx, the nitrogen oxide reduction apparatus 40 is connected to a rear end of the reaction chamber 30. The nitrogen oxide reduction apparatus 40 will be described in detail later.

The pipe 50 is connected to a rear end of the nitrogen oxide reduction apparatus 40. The pipe 50 has a water injection nozzle 51 formed at a sidewall thereof. The water injection nozzle 51 sprays water in a fine mist state, thereby quickly cooling the gas processed in the reaction chamber 30.

The after-treatment unit 70 uses the water injection nozzle to process water-soluble or acid gas and particulate materials that are generated after the decomposition. The water tank 60 is configured to store and drain water and the particulate materials introduced from the pipe 50 and the after-treatment unit 70.

Hereinafter, the nitrogen oxide reduction apparatus 40 will be described in detail with reference to FIG. 11. The nitrogen oxide reduction apparatus 40 includes a cylindrical housing (tube) 47. An opening at one end of the housing 47 is connected to the rear end of the reaction chamber 30. An opening at the other end of the housing 47 is connected to a leading end of the pipe 50. The gas processed by the plasma in the reaction chamber 30 flows through the reaction chamber 30, the nitrogen oxide reduction apparatus 40, and the line 50 in that order. The nitrogen oxide reduction apparatus 40 includes a cooling unit for rapidly cooling the gas processed in the reaction chamber 30 to a temperature lower than a nitrogen oxide generation temperature.

FIG. 11 shows a plurality of gas injection nozzles 44 as an example of the cooling unit. The gas injection nozzles 44 may be arranged radially with respect to the axis of the housing 47. The gas injection nozzles 44 may be formed at the housing 47 or may be formed at a gas supply ring 45 that is a separate member in the housing 47. The gas supply ring 45 may be formed in an annular shape and positioned inside the housing 47 of the nitrogen oxide reduction apparatus 40.

FIG. 12 shows the annular gas supply ring 45 having a plurality of gas injection nozzles 44. The gas injection nozzles 44 may be spaced apart from each other at a regular interval on the gas supply ring 45.

A low-temperature gas is injected into the inner space of the nitrogen oxide reduction apparatus 40 through the gas injection nozzles 44. At this time, a gas having no reactivity or low reactivity is used as the low-temperature gas. For example, an inert gas containing at least one of nitrogen gas and argon gas may be used as the low-temperature gas.

The temperature of the low-temperature gas is low enough to rapidly cool the gas processed in the reaction chamber 30 to a temperature lower than the nitrogen oxide generation temperature. For example, the low-temperature gas has a temperature of about 300° C. or less.

When the high-temperature gas processed in the reaction chamber 30 reaches the nitrogen oxide reduction apparatus 40, the low-temperature gas injected from the gas injection nozzles 44 rapidly cools the high-temperature gas. Accordingly, the generation of nitrogen oxide is reduced.

The gas injection nozzles 44 may be formed at any position along the axial direction of the housing 47 of the nitrogen oxide reduction apparatus 40. The gas injection nozzles 44 may be formed at multiple levels with different heights. When the gas injection nozzles 44 are close to the reaction chamber 30, the harmful gas processing efficiency may be decreased, and when the gas injection nozzles 44 are far from the reaction chamber 30, the nitrogen oxide reducing effect is decreased. Therefore, the gas injection nozzles 44 need to be arranged at a position where a desired harmful gas processing efficiency and a desired nitrogen oxide reducing effect can be achieved.

For example, the temperature of the nitrogen oxide reduction apparatus 40 becomes lower toward a position far from the reaction chamber 30. In the case of providing the gas injection nozzles 44 at a position where the temperature of the nitrogen oxide reduction apparatus 40 reaches about 800° C., the generation of nitrogen oxide can be effectively suppressed without decreasing the harmful gas processing efficiency.

In addition, a cooling water path 43 may be formed between an outer wall and an inner wall of the nitrogen oxide reduction apparatus 40. Cooling water is introduced from a cooling water inlet line 41 connected to a lower end of the nitrogen oxide reduction apparatus 40. Then, the cooling water flows from the bottom to the top of the cooling water path 43 and discharged from a cooling water outlet line 42 connected to an upper end of the nitrogen oxide reduction apparatus 40. Accordingly, the nitrogen oxide reduction apparatus 40 is cooled by the cooling water and the generation of nitrogen oxide is reduced more effectively.

FIG. 13 shows a nitrogen oxide reduction apparatus 40 according to another embodiment of the present disclosure. Redundant description of the same components in FIGS. 1 and 13 is omitted.

The nitrogen oxide reduction apparatus 40 shown in FIG. 13 includes a heat exchanger 46 as a cooling unit. The heat exchanger 46 may include a plurality of heat exchange pipes through which liquefied hydrogen or BOG (Boil-off Gas) flows. On the other hand, the heat exchanger 46 may include a plate, a tube or the like that exchanges heat. When the high-temperature gas processed in the reaction chamber 30 reaches the nitrogen oxide reduction apparatus 40, the heat exchanger 46 quickly cools the high-temperature gas. Accordingly, the generation of nitrogen oxide is reduced.

The cooling unit installed at the nitrogen oxide reduction apparatus 40 is not limited to the gas injection nozzle 44 or the heat exchanger 46. Any other units can be used as the cooling unit as long as they can quickly cool the gas from the reaction chamber 30. As for the cooling unit, both of the gas injection nozzle 44 and the heat exchanger 46 may be used.

The embodiments of the present disclosure can effectively reduce nitrogen oxide by cooling the plasma-processed gas by using the cooling unit without decreasing the harmful gas processing efficiency.

The embodiments of the present disclosure have been described based on the embodiments illustrated in the accompanying drawings. However, the above description is merely an example, and it will be understood by those skilled in the art that various changes and modifications can be made. Therefore, the technical protection scope of the present disclosure should be determined by the technical idea of the appended claims.

DESCRIPTION OF REFERENCE NUMERALS

40: nitrogen oxide reduction apparatus
41: cooling water inlet line
42: cooling water outlet line
43: cooling water path
44: gas injection nozzle
45: gas supply ring
46: heat exchanger
47: housing
100: cathode assembly
110: cathode
200: anode assembly
210: anode
220: magnetic force generator
230: opening
300: plasma generating gas introduction line
400: insulator
500: arc
S: plasma generation space
X1: axis of anode assembly
g: direction of vortex of plasma generating gas
P: arc anode spot
F: force applied to arc anode spot

The invention claimed is:

1. A gas treating apparatus comprising:
a reaction chamber configured to process a gas supplied from an outside by a plasma;
a nitrogen oxide reduction apparatus connected to the reaction chamber; and
a misting pipe configured to receive the processed gas from the nitrogen oxide reduction apparatus, the misting pipe comprising at least one water injection nozzle,
wherein the nitrogen oxide reduction apparatus includes a cooling unit,
wherein the nitrogen oxide reduction apparatus is configured to receive the processed gas from the reaction chamber,
wherein the cooling unit is located such that processed gas would pass through the cooling unit of the nitrogen oxide reduction apparatus,
wherein the cooling unit includes a plurality of gas injection nozzles configured to inject a low-temperature gas, wherein the plurality of gas injection nozzles are separate from the at least one water injection nozzle,
wherein gas injection nozzles of the plurality of gas injection nozzles are formed at multiple locations of the nitrogen oxide reduction apparatus with multiple and different axial heights of the cooling unit,
wherein the processed gas from the reaction chamber reaches the gas injection nozzles of the cooling unit, and the low-temperature gas is configured to cool the processed gas within the cooling unit to a temperature lower than a nitrogen oxide generation temperature vet maintain the processed gas above a harmful-gas processing temperature, and
wherein the misting pipe is configured to further cool the processed gas.

2. The gas treating apparatus of claim 1,
wherein the nitrogen oxide reduction apparatus and the cooling unit further comprises a cylindrical housing and at least one annular gas supply ring located at a first axial height of the multiple and different axial heights inside the cylindrical housing of the cooling unit, and wherein the at least some of the plurality of gas injection nozzles are provided on the gas supply ring.

3. The gas treating apparatus of claim 1, wherein the low-temperature gas is an inert gas comprising at least one of nitrogen gas and argon gas.

4. The gas treating apparatus of claim 1, wherein the cooling unit includes a heat exchanger.

* * * * *